Sept. 27, 1966   D. C. FREEMAN, JR., ETAL   3,275,857
SUPERCONDUCTIVE SYSTEMS

Filed Aug. 7, 1963   3 Sheets-Sheet 1

INVENTORS
DONALD C. FREEMAN, JR.
EUGENE J. M. LYNCH
BY Barnwell R. King
ATTORNEY Sept. 27, 1966    D. C. FREEMAN, JR., ETAL    3,275,857
SUPERCONDUCTIVE SYSTEMS Filed Aug. 7, 1963    3 Sheets-Sheet 2

INVENTORS
DONALD C. FREEMAN, Jr.
EUGENE J. M. LYNCH
BY
Barnwell P. King
ATTORNEY 3,275,857
Patented Sept. 27, 1966

3,275,857
SUPERCONDUCTIVE SYSTEMS
Donald C. Freeman, Jr., and Eugene J. M. Lynch, Tonawanda, N.Y., assignors to Union Carbide Corporation, a corporation of New York
Filed Aug. 7, 1963, Ser. No. 300,539
6 Claims. (Cl. 307—149)

This invention relates to superconductive systems and more particularly to the inductive storage of relatively large amounts of rapidly recoverable electrical energy.

The invention provides a very large superconductive energy storage system comprising a battery of novel superconductive inductive storage cells. Switching means are associated therewith for selectively charging and discharging such cells. Also, refrigerative means are used for maintaining the battery cells in a superconductive condition. The cells of the invention include a coaxially arranged cylinder and core, and a combination support and switching device disposed within said cylinder and around said core for controlling the superconductive current.

An increasing number of industrial and governmental applications require the storage and rapid release of large quantities (over 100 joules) of electrical energy. Heretofore available systems for such purpose were large, complex and expensive, so that new concepts of energy storage were needed. Any new concept merits careful consideration as to ultimate feasibility and cost, since even a slight cost advantage per joule can result in a considerable economy because of the tremendous investments required.

Comparisons of various known methods for energy storage in general are available in the literature. (See, for example, R. Carruthers, "High Magnetic Fields," Kolm, Lax, Bitter, and Mills, editors, MIT and Wiley, 1962, page 307.) Such evaluations indicate that as the desired magnitude of energy storage increases, and if release of the energy in the order of milliseconds is required, the use of inductors for energy storage becomes more and more advantageous. The particulars of energy storage in conventional solenoid type inductors are well known so that further discussion is unnecessary here. A major disadvantage, however, is that normally conductive inductors are dissipative, i.e., long term energy storage can be achieved only by sacrifice of the considerable power required to overcome resistive losses in the inductor.

The advent of "high field" superconductivity has opened up the possibility of completely eliminating the above major disadvantage of inductors for long term energy storage. It has been shown by us and others that very high magnetic fields (representing stored energy) can be maintained in superconducting inductors for long periods of time with absolutely no power input to the inductor after the field is established. This is achieved by utilizing the so-called persistent mode of operation, which should, according to well founded principles and experimental evidence, maintain the field without dissipation for times approaching infinity. The inductor must, of course, be held close to the temperature of liquid helium throughout the period of energy storage. The energy required to provide this refrigeration is quite small, and reliability is high.

The important parameters which determine the cost of such a system are the energy stored per unit mass of superconductor and the energy stored per unit volume; or, for a fixed total energy storage requirement, the total mass and the total volume of the system. The former will determine the cost of the superconducting material, and the latter the cost of the cryogenic insulation and refrigeration. The total mass will also determine the initial cool-down cost.

The actual inductance required is dictated by the product of the desired discharge time and the load resistance. For most applications it is safe to state that the inductance must be small, preferably no more than a few henries. This requirement immediately rules out large wire wound inductors. Furthermore, breaking such an inductor up into many small coils in parallel is not desirable because the performance efficiency of many small coils in combination is much less than that of one large coil of comparable storage capacity.

The presence of large magnetic fields over distances of many feet from a solenoid type inductor is undesirable. In some cases these can be tolerated, particularly since configurations which give rise to fields over very large volumes will be probably the most efficient on a cost/joule basis. In other cases, large field cancelling loops can be employed. The tremendous loop sizes that might be required in large storage systems, however, would add considerably to the cost.

For large values of stored energy a modular system is most desirable so that available power mains or batteries can be used for changing individual modules in succession. Therefore, means of switching from a charging circuitry to a discharge circuitry is provided. This type of switching is easily carried out with superconductors.

Figure 1:
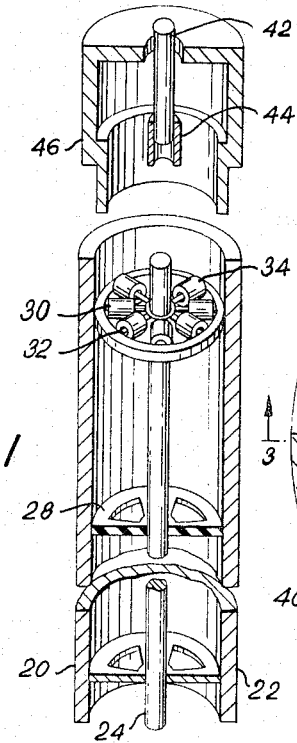
FIG. 1 is a fragmentary perspective view of one inductive storage cell illustrative of the invention.
Figure 2:
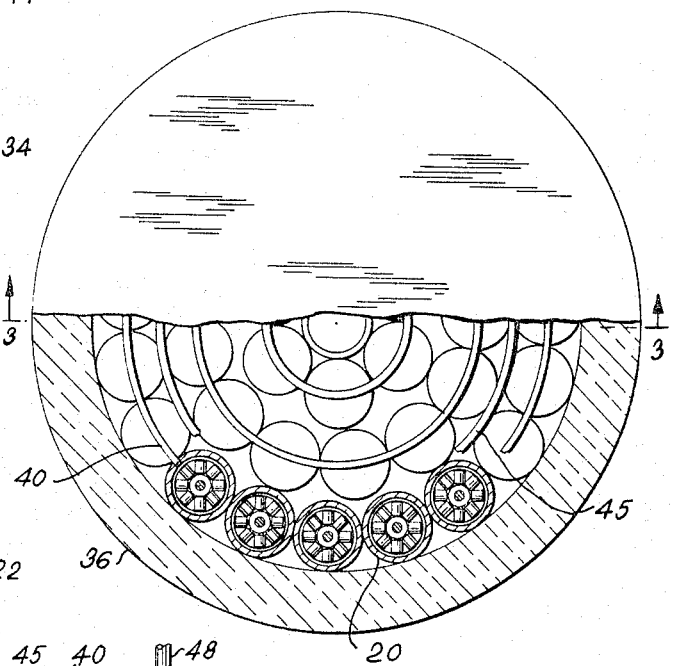
FIG. 2 is an enlarged fragmentary top view, partly in plan and partly in cross-section of a battery of such cells.
Figure 3:
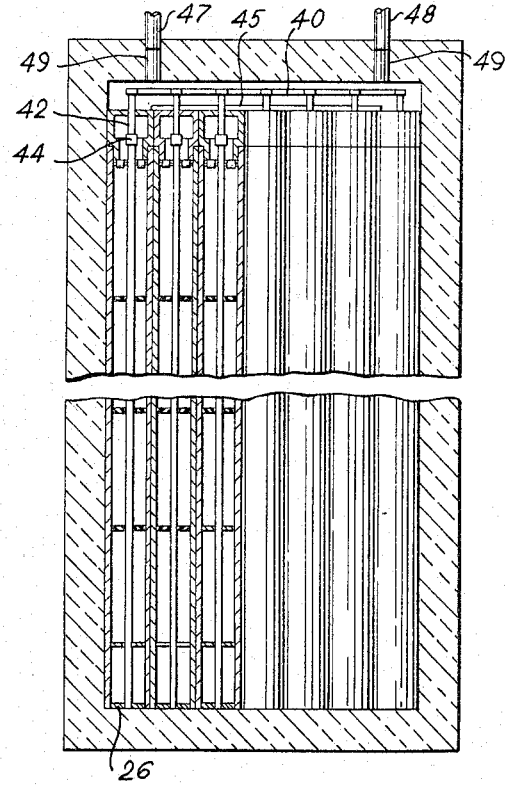
FIG. 3 is a fragmentary view in vertical section taken on line 3—3 of FIG. 2.

As shown in FIGS. 1–3, each cell 20 includes an elongated cylinder 22 composed of superconductive material and an axially arranged superconductive core 24 supported by a superconductive spider or plate 26 near the bottom. Intermediate non-conductive spiders 28, as may be required, are also provided. A current switching radial connector or spider 30 is located near the top of the cell. The cell 20 is composed of superconductive material, such as a niobium$_3$-tin; and the spokes 32 of the spider 30 are provided with solenoids 34 which, when energized, act to block the flow of current in the series circuit consisting of cylinder 22, spider 26, core 24 and spider 30. Heaters or switches may be used instead of solenoids to block the flow of persistent current.

Figure 6:
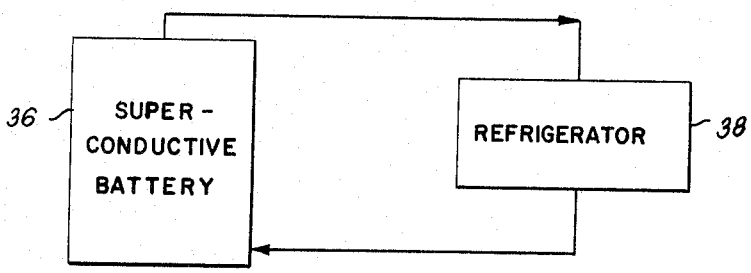
FIG. 6 is a diagram of the battery cooling system.

A plurality of cells 20 are fitted in a cryogenically insulated container 36 which is maintained at a temperature of about 4.2° K., by a suitable refrigerator 38, FIG. 6. The upper ends of the cores 24 of the cells 20 are connected to a circular bus bar 40 by vertical connectors 42 including sleeves 44. The cylinders 22 are connected to a circular bus bar 45 by inverted cups 46 which telescope into the upper portion of the corresponding cylinder. The main current leads 47, 48 are retractable in holes 49, 49 in the top of the casing to reduce heat leak into the cryogenic environment.

Figure 4:
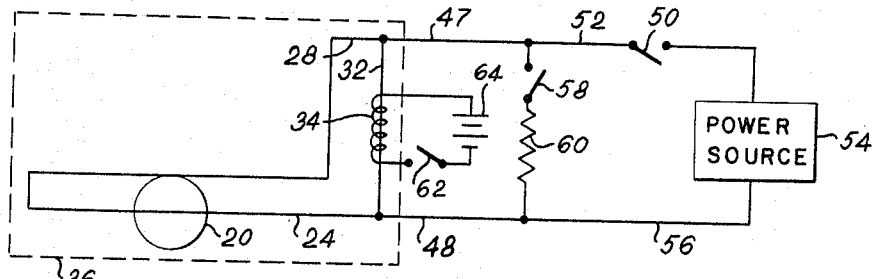
FIG. 4 is a circuit diagram of an electrical system associated with one cell by way of example.

As shown in FIG. 4, for example, cell 20 is energized by first closing switch 62 to energize the solenoids 34 by current from battery 64 and thus make the spokes 32 of spider normally conductive, i.e., non-superconductive, and then closing switch 50 in series leads 47 and 52 to a D.C. power source 54, the other lead 56 of which is connected to the core 24 via lead 48. This establishes a superconductive current flow in the cell. The persistent superconductive current flow mode is established in the cell itself by opening switch 62, and the superconductive current continues even when the switch 50 is also opened. When it is desired to use current from cell 20, switch 58 is first closed to connect a load 60 across leads 52 and 56, and switch 62 is then closed to convert spokes 32 of the spider to normal conductors. Current from the cell is thereupon discharged to load 60.

Figure 5:
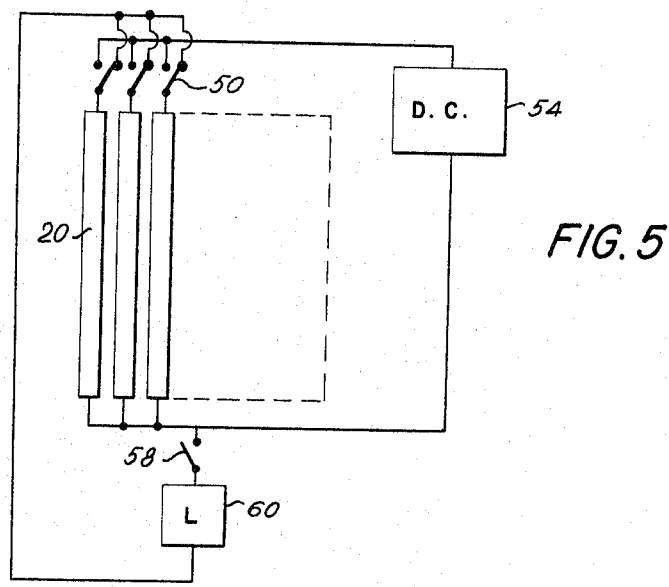
FIG. 5 is a simplified circuit diagram of an illustrative electrical system for several cells.

As shown in FIG. 5, the cells may be selectively charged by closing switches 50 in sequence, and all discharged to a common load 60 by closing switch 58.

Figure 7:
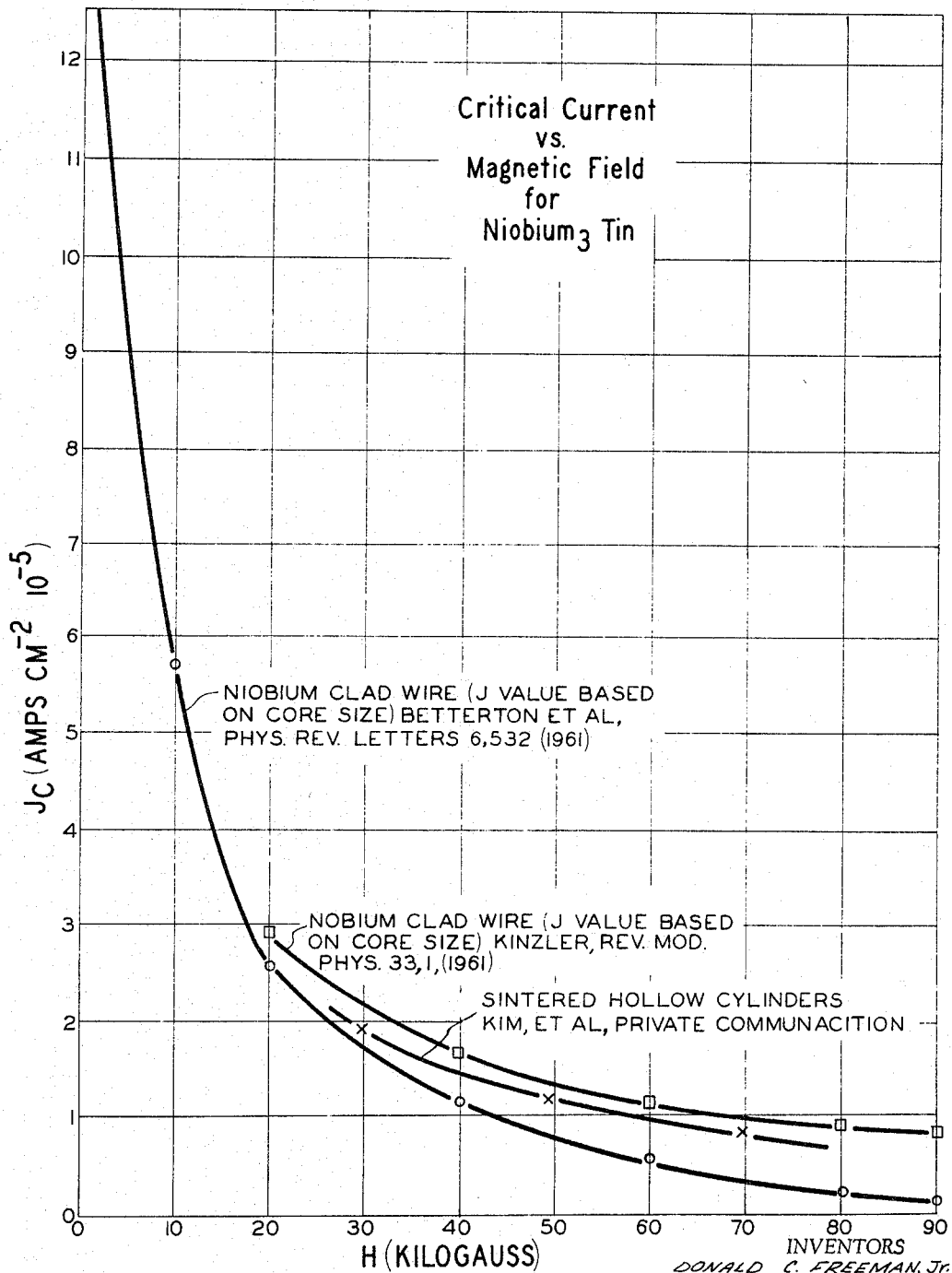
FIG. 7 is a graphical representation of data for calculating parameters of the invention.

In the present system the energy stored is proportional to the current squared, and therefore, it is desirable to have the persistent current as high as possible. In the case of superconductors "the maximum possible current" is the critical current, above which the material becomes a normal conductor. There are very few data on the critical currents of hard superconductors in the relatively large sizes since most of the measurements have been made on wires of the order of 10-30 mils in diameter. Some of the results are shown in FIG. 7. These data are shown as critical current densities versus applied magnetic fields.

Probably the most reliable data for determining the total amount of energy that can be stored according to our invention is that of Kim, Hempstead, and Strnad, Phys. Rev. Letters 9 306 (1962), which is also shown in FIG. 7. These data were obtained by observing axial flux trapping in hollow, i.e., coreless cylinders, and the annular currents shown are the calculated average current densities; the fields are the average axial fields within the superconductor. Kim et al. have given an expression for the annular current density versus axial field which fits their data for several different materials, and we have used this expression, with their constants for $Nb_3Sn$ in the calculations as shown in Equation 1.

$$J_c = \frac{\alpha}{B_s + B_o} \quad (1)$$

where
$$\alpha = 7.5 \times 10^6 \text{ kg. a./cm.}^2$$
and
$$B_o = 6 \text{ kg.}$$

In this expression, $J_c$ is the critical current density, and $B_s$ is the average field in the superconductor. The subscripts $s$ indicates the field at the surface of the center conductor of the coaxial element.

Now, if we use the well known expression for the field of a long straight current carrying wire which is equivalent to the core of our cell we can find for a given surface field and current density the radius of the conductor which carrying this current density has this surface field from Equation 2.

$$r = \frac{2B_s}{\mu_0 J_c} \quad (2)$$

Thus, for a chosen surface field at the surface of the inner conductor, we calculate a current density for Equation 1, and then the radius of the center conductor from Equation 2. In order to complete the size determination of the system, we must specify the dimensions of the outer conductor. We must do this in such a way that the cross sectional area is sufficient to carry the current carried by the center conductor, and we would like to do it in such a way that the energy stored per unit weight (or per unit cost of superconductor) is a minimum. The first requirement is satisfied if we take the dimensions such that the cross section of the outer conductor is equal to that of the inner conductor. (This actually more than satisfies the requirement; since the outer conductor is in a region of lower field than the inner conductor, its critical current density is higher.) Under this equal cross sections assumption, we find that there is no optimum outer conductor size.

The energy stored per unit weight increases monotomically with outer conductor radius. This increase is, however, only logarithmic and, since the outer conductor wall thickness decreases linearly with increasing radius (for constant cross section), this wall thickness becomes impractically small before an appreciable increase in the energy stored per unit mass has occurred. We shall assume that the wall thickness, $t$, of the outer conductor is fixed at the smallest practicable size, which we shall take to be 0.1 mm. With this assumption, we shall find that there is an optimum size for the outer conductor.

The inductance per unit length of coaxial conductors is given by an expression adapted from Grover, Inductance Calculations, Dover Publications, New York (1962).

$$L' = \frac{\mu_0}{8\pi}\left[-2 \ln x - 4\frac{(1-y)}{y} \ln (1-y) - 3\right]$$
$$= \mu_0/8 F(x,y) \quad (3)$$

where $x = r_c^2/r_o^2$; $y = 1 - r_i^2/r_o^2 = 2t/r_o$ and $r_i$ is the inner radius of the outer conductor. The energy stored per unit length is therefor $$W' = \tfrac{1}{2} L' I^2$$
$$= \frac{\mu_0}{16} J_c^2 r_c^4 F(x,y) \quad (4)$$

The mass per unit length is simply the sum of the masses of the two conductors, or $$M' = \pi\rho(r_c^2 + r_o^2 - r_i^2) = \pi\rho r_c^2(1 + y/x) \quad (5)$$

where $\rho$ is the density. The energy stored per unit mass is therefore $$\frac{W}{M} = \frac{\mu_0}{16\rho} J_c^2 r_c^2 \frac{xF(x,y)}{x+y} \quad (6)$$

We now wish ot find the values of $x$ and $y$ (or $r_o$) for which $W/M$ is the greatest, that is we wish to maximize the function $$f(x, y) = \frac{-x}{x+y}\left[2 \ln x + 4\frac{(1-y)}{y} \ln (1-y) + 3\right] \quad (7)$$

We know that $y$ is small compared with 1 (but not necessarily compared with $x$) and, therefore, a good approximation is $$f(x, y) \cong \frac{-x}{x+y}[2 \ln x - 1] \quad (8)$$

Maximizing this function with respect to $r_o$, and writing the result in terms of the actual dimensions, we obtain the following transcendental equation, $$\ln \frac{r_o}{r_c} = \tfrac{1}{2}\frac{r_o^2}{r_o t} + \tfrac{3}{4} \quad (9)$$

This equation can be solved numerically to find the optimum radius of the outer conductor.

The above equations have been applied assuming allowable magnetic fields at the surface of the inner conductor of 20, 40, 60, 80 and 100 kgauss. The results are shown below. It should be noted that for those surface fields which result in small length to outer diameter ratios (80 and 100 kgauss), these results lose validity for the assumption of a long coaxial system is violated and end effects will be important. The remaining results will still be valid, however, even if the total length of element required is made up of independent sections, as long as the length of these sections is over about ten times the outer diameter. It will be noted that for the 40 and 60 kgauss cases which we feel confident could be practically achieved, the mass, length and radius requirements are all quite reasonable, and the weight requirement in particular compares favorably with other storage systems.

| $B_s$ kgauss | $J_o$ $A/cm.^2 \times 10^{-5}$ | $r_c$ cm. | $r_o$ cm. | $W/M$ $J/Kgm.$ | $I$ $A \times 10^{-4}$ |
|---|---|---|---|---|---|
| 20 | 2.88 | 0.63 | 0.111 | 76.8 | 1.11 |
| 40 | 1.63 | 4.5 | 0.391 | 2,500 | 7.83 |
| 60 | 1.14 | 16 | 0.838 | 7,300 | 25.2 |
| 80 | 0.87 | 40 | 1.46 | 15,000 | 58.3 |
| 100 | 0.71 | 85 | 2.24 | 26,000 | 112 |

Considering the strength requirements of the cylindrical outer conductor in order that it may contain the magnetic field, the force per unit length on a straight wire in a transverse field is $$F' = BI \quad (10)$$

The force per unit length on an element of the outer conductor of circumferential dimension $\Delta C$ is $$F' = BJt\Delta C \quad (11)$$

and the pressure exerted on the outer conductor is $$P = BJt \quad (12)$$

The field in the annular region decreases inversely with radial distance, and if the inner and outer conductors have equal cross sectional areas, the current density is the same in each; therefore $$P = B_s \frac{r_c}{r_o} J_o t \quad (13)$$

The tangential stress in a thin walled tube containing pressure is approximately $$\sigma = \frac{Pr_o}{t} \quad (14)$$

and therefore $$\sigma = B_s r_c J_o$$

and, using Equation 2

$$\sigma = \frac{2B_s^2}{\mu_o} \quad (15)$$

For a 100 kg. field at the surface of the inner conductor, the stress in the outer conductor is $1.59 \times 10^8$ $N/m.^2$ or 23,000 lbs. per in.$^2$, which is well below usual metallic tensile strengths.

As pointed out above, to cause the stored energy to flow out of the coaxial elements into the bus system any suitable means can be used to cause the spokes to become normally conducting. For example:

The tubular elements surrounding the spokes can be considered to be small solenoids controllable from outside of the cryogenic enclosure. If these solenoids are energized so as to produce a magnetic field greater than the critical field of the spokes, then the spokes will become normal and the current will flow out of the element at a rate dependent on the load resistance and inductance. This is the best means for a slow and controlled energy release and can provide power at any frequency from D.C. to megacycles.

If the tubular elements are visualized as heating coils, also controllable from outside the enclosure, then sufficient electrical energy can be applied to the coils so as to cause the spokes to become normal by heating above the transition temperature. Because specific heats are extremely low at helium temperatures, this method can be very rapid and does not consume a significant amount of energy in the heater coils.

For extremely rapid release of power in the form of pulses, the tubular elements can be visualized as explosive devices such that on a triggering impulse from outside the enclosure, the spokes are mechanically destroyed.

It is obvious that with any of the above methods of energy recovery, power can be obtained from a single element, a multiplicity of elements simultaneously, or a number of elements in a selected programmed sequence, so as to adapt to particular load requirements.

What is claimed is:

1. A superconductive system comprising, in combination, a thermally insulated container, a plurality of cylinders of superconductive material in said container, a coaxial core of superconductive material in each cylinder, radial connectors supporting said cores within said cylinders so that each cylinder and its core provides a superconductive circuit, a common load circuit connected to said cylinders and to said cores, means including cryogenic material for maintaining said superconductive circuits in the superconductive state, and control means associated with at least one of said radial connectors in each of such superconductive circuits for energizing each of such circuits with current, and for discharging current in said circuits through said common load circuit.

2. A superconductive system comprising, in combination, a thermally insulated container, a plurality of superconductive circuits in said container, each consisting of a tube and a core of superconductive material in coaxial relationship together with radial connectors at least one of which includes means for controlling the flow of current in such circuits, and means for maintaining said circuits in a superconductive state.

3. A superconductive system as called for by claim 2, including a refrigerator connected to said container for circulating cryogenic material through said container.

4. A superconductive energy storage system, comprising in combination a battery of superconductive current storage cells, means for selectively charging said cells, and means for selectively discharging said cells.

5. A system as defined by claim 4, including means for discharging in a predetermined sequence all said cells through a common load circuit.

6. A superconductive current storage cell comprising in combination, a coaxially arranged cylinder and core, and a combination support and switching device disposed within said cylinder and around said core for controlling the superconductive current, in which said device comprises radial spokes and a means on each spoke for controlling the flow of superconductive current therethrough.

References Cited by the Examiner

UNITED STATES PATENTS 3,094,628  6/1963  Jiu.
3,219,841  11/1965  Edwards et al. _____ 307—88.5

ORIS L. RADER, *Primary Examiner.*

W. SHOOP, *Assistant Examiner.*